United States Patent
Tabbert et al.

(10) Patent No.: US 9,409,505 B2
(45) Date of Patent: Aug. 9, 2016

(54) VEHICLE SEAT FOR ACCOMMODATING AN OCCUPANT-WORN OBJECT

(71) Applicant: GM GLOBAL TECHNOLOGY OPERATIONS LLC, Detroit, MI (US)

(72) Inventors: Christian Tabbert, Trebur (DE); Romina Schwarz, Allendorf/Lumda (DE); Michael Linden, Nackenheim (DE)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 14/575,697

(22) Filed: Dec. 18, 2014

(65) Prior Publication Data

US 2015/0175043 A1    Jun. 25, 2015

(30) Foreign Application Priority Data

Dec. 20, 2013 (DE) .................. 10 2013 021 862

(51) Int. Cl.
| | |
|---|---|
| *B60N 2/64* | (2006.01) |
| *B60N 2/58* | (2006.01) |
| *B60N 2/68* | (2006.01) |
| *B60R 11/00* | (2006.01) |
| *B60N 2/70* | (2006.01) |

(52) U.S. Cl.
CPC *B60N 2/646* (2013.01); *B60N 2/58* (2013.01); *B60N 2/5825* (2013.01); *B60N 2/5891* (2013.01); *B60N 2/643* (2013.01); *B60N 2/68* (2013.01); *B60N 2/7017* (2013.01); *B60R 11/00* (2013.01); *B60R 2011/0012* (2013.01); *Y10T 29/481* (2015.01)

(58) Field of Classification Search
CPC ...... B60N 2/646; B60N 2/643; B60N 2/5825; B60N 2/7017; B60N 2/68; B60N 2/58; B60N 2/5891; B60R 11/00; B60R 2011/0012; Y10T 29/481
See application file for complete search history.

(56) References Cited

U.S. PATENT DOCUMENTS

| | | | | |
|---|---|---|---|---|
| 3,612,607 | A |   | 10/1971 | Lohr |
| 5,441,331 | A | * | 8/1995 | Vento ................. B60N 2/10 297/452.14 |
| 8,215,714 | B2 | * | 7/2012 | Galbreath ............ B60N 2/70 297/452.27 |
| 9,004,605 | B2 | * | 4/2015 | Nishiyama .......... B60N 2/44 297/452.27 |

(Continued)

FOREIGN PATENT DOCUMENTS

| | | |
|---|---|---|
| DE | 2033546 A1 | 1/1971 |
| DE | 102011007633 A1 | 11/2011 |

(Continued)

OTHER PUBLICATIONS

Search Report dated Jul. 17, 2014 in DE 102013021 862.4.

*Primary Examiner* — Rodney Mintz
(74) *Attorney, Agent, or Firm* — Ingrassia Fisher & Lorenz PC (57) ABSTRACT

The present disclosure described a vehicle seat that includes a seat part with an elastic seat padding, a backrest part with an elastic backrest padding, and a seat cover for the seat part and a seat cover for the backrest part. The elastic seat padding has a primary seat padding part and at least one secondary seat padding part. The elastic backrest padding has a primary backrest padding part and at least one secondary backrest padding part. The secondary seat padding and the secondary backrest padding part are softer than the primary seat padding and the primary backrest padding part, respectively.

10 Claims, 5 Drawing Sheets

(56) References Cited

U.S. PATENT DOCUMENTS

| | | |
|---|---|---|
| 2003/0222494 A1 | 12/2003 | Mallery |
| 2006/0170274 A1* | 8/2006 | Moule ............... B60N 2/643 297/452.25 |
| 2006/0273650 A1* | 12/2006 | Embach ............... B60N 2/70 297/452.27 |
| 2011/0278902 A1* | 11/2011 | Galbreath ............ B60N 2/70 297/452.48 |
| 2013/0313885 A1* | 11/2013 | Nishiyama ........... B60N 2/44 297/452.21 |

FOREIGN PATENT DOCUMENTS

| | | | | |
|---|---|---|---|---|
| DE | 102013209606 A1 | | 11/2013 | |
| GB | 2521502 A | * | 6/2015 | ............ B60N 2/58 |
| JP | 09168678 A | * | 6/1997 | |
| JP | 2007006911 A | * | 1/2007 | |

\* cited by examiner

VEHICLE SEAT FOR ACCOMMODATING AN OCCUPANT-WORN OBJECT

CROSS REFERENCE TO RELATED APPLICATION

This application claims priority to German Patent Application No. 102013021862.4 filed Dec. 20, 2013, which is incorporated herein by reference in its entirety.

TECHNICAL FIELD

The technical field pertains to a vehicle seat and a method for manufacturing a vehicle seat, and in particular a vehicle seat which accommodates an occupant-worn object such as a gun or a baton on a person seated in the vehicle seat that reduces high compressive forces exerted upon the seated person.

BACKGROUND

Motor vehicles serve for accommodating persons and feature vehicle seats for the accommodation thereof within their interior. The vehicle seats include a seat cushion or seat part and a seat back or backrest part. In this case, the seat part features an elastic seat padding of foam material and a seat cover is arranged on the elastic seat padding. If the motor vehicle is used as an emergency vehicle such as, for example, a police car or a fire truck, the emergency personnel, for example policemen, generally carry objects on their bodies. These objects, for example a gun or a baton, are generally fixed on a belt worn by the person. When this person is seated in the vehicle seat, increased compressive forces occur between the person and the object because the object locally has a greater spatial extent than the body of the person. As a result, the seat padding locally is elastically deformed to a greater degree in the region of the object such that increased compressive forces are exerted upon the object by the elastic seat padding. This also applies analogously to the backrest part.

This is unpleasant for the person seated in the vehicle seat and the objects generally cannot be stored separately, but rather always need to be carried on the body of the person due to the emergency conditions. Such high compressive forces therefore are unpleasant for the person seated in the vehicle seat such that only little comfort is provided. US 2003/022 494 A1 discloses a seat for a vehicle. The backrest part of the seat features a recess for accommodating a gun belt of a policeman.

SUMMARY

In accordance with the present disclosure, a vehicle seat and a method for manufacturing a vehicle seat are provided in which objects such as, e.g., a gun or a baton on a person seated in the vehicle seat, e.g. a policeman, do not exert high compressive forces upon the person.

In particular, a vehicle seat, particularly for a motor vehicle, includes a seat part with an elastic seat padding, a backrest part with an elastic backrest padding, a seat cover for the seat part and a seat cover for the backrest part. The elastic seat padding includes a primary seat padding part and at least one secondary seat padding part. The secondary seat padding part is softer than the primary seat padding part. Likewise, the elastic backrest padding includes a primary backrest padding part and at least one secondary backrest padding part. The secondary backrest padding part is softer than the primary backrest padding part. At least one recess for accommodating objects such as, e.g., a gun on persons seated in the vehicle seat is realized on the preferably one-piece seat padding and/ or at least one recess for accommodating objects such as, e.g., a gun on persons seated in the vehicle seat is realized on the preferably one-piece backrest padding. The secondary seat padding part is softer than the primary seat padding part and the at least one secondary seat padding part is arranged on the seat padding in such a way that the object on the person is arranged in the region of the secondary seat padding part. Due to the softer properties of the secondary seat padding part, compressive forces between the person and the elastic seat padding on the object are reduced because the object is arranged on the secondary seat padding part. This also applies analogously to the elastic backrest padding. In a design with at least one recess, the object on the body of the person can be at least partially arranged within the recess such that this likewise only causes low forces to occur between the person and the seat padding on the object. This also applies analogously to the backrest padding.

In an additional embodiment, the secondary seat padding part is realized on the upper side of the seat padding such that the seat cover for the seat part lies on the secondary seat padding part and/or the secondary backrest padding part is realized on the upper side of the backrest padding such that the seat cover for the backrest part lies on the secondary backrest padding part. The secondary seat padding part is realized on the upper side of the seat padding such that only the seat cover is arranged between the object on the body of the person and the secondary seat padding part. This also applies analogously to the at least one secondary backrest padding part.

In an additional variation, at least one fastening element is realized on the primary seat padding part, and a complementary fastening element is respectively realized on the secondary seat padding part. The secondary seat padding part is fastened on the primary seat padding part in that the at least one fastening element and the at least one complementary fastening element are connected to one another. Likewise, at least one fastening element is realized on the primary backrest padding part, and at least one complementary fastening element is respectively realized on the at least one secondary backrest padding part. The secondary backrest padding part is fastened on the primary backrest padding part in that the at least one fastening element and the at least one complementary fastening element are connected to one another. The secondary seat padding part therefore is or can be very easily fastened on the primary seat padding part, particularly in a separable fashion, such that the secondary seat padding part can be replaced with a part that has the same elastic properties as the primary seat padding part if the motor vehicle is no longer used as an emergency vehicle to provide a normal, conventional vehicle seat, which is not intended for emergency personnel. This also applies analogously to the primary backrest padding part.

In another embodiment, the at least one fastening element and the at least one complementary fastening element are positively and/or non-positively connected to one another.

In an additional variation, the fastening element on the primary seat padding part is realized integrally with and made of the same material as the primary seat padding part and/or the at least one complementary fastening element on the secondary seat padding part is realized integrally with and made of the same material as the secondary seat padding part. The fastening element on the primary backrest padding part is realized integrally with and made of the same material as the primary backrest padding part and/or the at least one complementary fastening element on the secondary backrest padding part is realized integrally with and made of the same material as the secondary backrest padding part.

The complementary fastening element is advantageously realized in the form of a neck with a thickening on the end of the neck and the fastening element is realized in the form of the boundary of a bore. The neck is arranged within the bore and the thickening is arranged outside the bore, and the diameter of the thickening is greater than the diameter of the bore such that the complementary fastening element is fastened on the boundary of the bore with the thickening. Alternately, the fastening element is realized in the form of a neck with a thickening on the end of the neck and the complementary fastening element is realized in the form of the boundary of a bore. The neck is arranged within the bore and the thickening is arranged outside the bore, and the diameter of the thickening is greater than the diameter of the bore such that the fastening element is fastened on the boundary of the bore with the thickening. The thickening of the head on the end of the neck can be elastically deformed such that the shape of the thickening or the head is elastically restored after it is pushed through the bore and the thickening or the head therefore is positively fastened on the boundary of the bore.

In another embodiment, the elastic seat padding, particularly the primary seat padding part and the secondary seat padding part includes, at least partially, and more preferably entirely, of foam material. The elastic backrest padding, particularly the primary backrest padding part and the secondary backrest padding part, includes at least partially and more preferably entirely, of foam material.

In an additional embodiment, the seat part includes a shell structure and the elastic seat padding is fastened on the shell structure. The backrest part includes a shell structure and the elastic backrest padding is fastened on the shell structure. The shell structure of metal and/or plastic has high rigidity such that reliable and permanent positioning of the vehicle seat within the motor vehicle is thereby ensured.

In accordance with a method for manufacturing a vehicle seat, particularly a vehicle seat of the type described in this application, includes providing an elastic seat padding for a seat part and providing an elastic backrest padding for a backrest part. A shell structure for the seat part and for the backrest part is provided. A seat cover is fastens to the seat padding on the shell structure and the backrest padding on the shell structure. The seat cover is fastened on the seat padding and on the backrest padding. At least one section of the seat padding is removed such that at least one recess for accommodating objects on persons seated in the vehicle seat, e.g. a gun, is produced on the remaining primary seat padding part. At least one section of the backrest padding is removed such that at least one recess for accommodating objects on persons seated in the vehicle seat, e.g. a gun, is produced on the remaining primary backrest padding part.

In an additional variation, the at least one section is removed from the upper side of the seat padding and/or the at least one section is removed from the upper side of the backrest padding. The removal on the upper side is necessary because the object on the person ultimately lies on the upper side of the vehicle seat.

In an additional embodiment, a secondary seat padding part is respectively fastened in the at least one recess on the primary seat padding part and/or a secondary backrest padding part is respectively fastened in the at least one recess on the primary backrest padding part. The at least one secondary seat padding part is softer than the primary seat padding part such that the forces occurring between the object and the vehicle seat are thereby reduced and the object furthermore is at least partially arranged within the recess because a significant elastic deformation of the secondary seat padding part takes place. This also applies analogously to the secondary backrest padding part.

The secondary seat padding part preferably has a smaller volume than the recess on the primary seat padding part and/or is softer than the primary seat padding part. The secondary backrest padding part has a smaller volume than the recess on the primary backrest padding part and/or is softer than the primary backrest padding part. Due to the smaller volume and/or the softer properties of the secondary seat padding part, lower forces occur between the object and the vehicle seat and therefore also between the person and the object. This also applies analogously to the secondary backrest padding part.

In an additional embodiment, the secondary seat padding part is positively and/or non-positively fastened on the primary seat padding part, particularly in that a neck of the at least one secondary seat padding part with a thickening on the end of the neck is inserted into a bore, particularly a through-bore, in the primary seat padding part until the elastic thickening is arranged in the region of the bore on its end that faces away from the seat surface. The secondary backrest padding part is positively and/or non-positively fastened on the primary backrest padding part, particularly in that a neck of the at least one secondary backrest padding part with a thickening on the end of the neck is inserted into a bore, particularly a through-bore, in the primary backrest padding part until the elastic thickening is arranged in the region of the bore on its end that faces away from the backrest surface.

The seat cover on the remaining primary seat padding part is advantageously placed on the at least one recess or the seat cover is placed on the at least one secondary seat padding part. The seat cover on the remaining primary backrest padding part is placed on the at least one recess or the seat cover is placed on the at least one secondary backrest padding part. The elastic seat padding is provided with a bore in the form of a blind bore and this blind bore is transformed into a through-bore due to the removal of the at least one section and/or the elastic backrest padding is provided with a bore in the form of a blind bore and this blind bore is transformed into a through-bore due to the removal of the at least one section.

An motor vehicle features at least one vehicle seat, wherein the vehicle seat is realized in the form of a vehicle seat of the type described in this application.

The secondary seat padding part is softer than the primary seat padding part and this means, in particular, that the modulus of elasticity and/or the Hookean spring constant of the secondary seat padding part is lower than that of the primary seat padding part. The modulus of elasticity and/or the Hookean spring constant of the secondary seat padding part particularly lies below 90%, 70%, 50% or 30% of the modulus of elasticity and/or the Hookean spring constant of the primary seat padding part.

The secondary backrest padding part is softer than the primary backrest padding part and this means, in particular, that the modulus of elasticity and/or the Hookean spring constant of the secondary backrest padding part is lower than that of the primary backrest padding part. The modulus of elasticity and/or the Hookean spring constant of the secondary backrest padding part particularly lies below 90%, 70%, 50% or 30% of the modulus of elasticity and/or the Hookean spring constant of the primary backrest padding part.

The vehicle seat advantageously includes a device for pivoting the backrest part about an essentially horizontal pivoting axis.

The volume of the secondary seat padding part is smaller than the volume of the primary seat padding part, wherein the volume of the secondary seat padding part particularly is smaller than 70%, 50%, 40%, 30%, 20% or 10% of the volume of the primary seat padding part. In another embodiment, the volume of the secondary backrest padding part is smaller than the volume of the primary backrest padding part, wherein the volume of the secondary backrest padding part particularly is smaller than 70%, 50%, 40%, 30%, 20% or 10% of the volume of the primary backrest padding part.

BRIEF DESCRIPTION OF THE DRAWINGS

The present disclosure will hereinafter be described in conjunction with the following drawing figures, wherein like numerals denote like elements.

DETAILED DESCRIPTION

The following detailed description is merely exemplary in nature and is not intended to limit the present disclosure or the application and uses of the present disclosure. Furthermore, there is no intention to be bound by any theory presented in the preceding background or the following detailed description.

Figure 1:
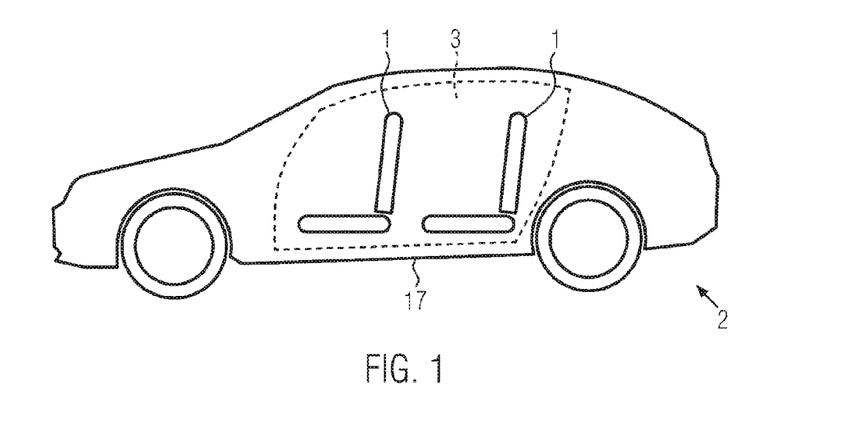
FIG. 1 shows a side view of a motor vehicle.

A motor vehicle 2 with a vehicle body 17 and an engine such as, for example, an internal combustion engine and/or electric motor serves for accommodating persons within an interior 3 of the motor vehicle 2. Vehicle seats 1, for example two front seats 1 and three back seats 1, are arranged within the interior 3 for this purpose.

Figure 2:
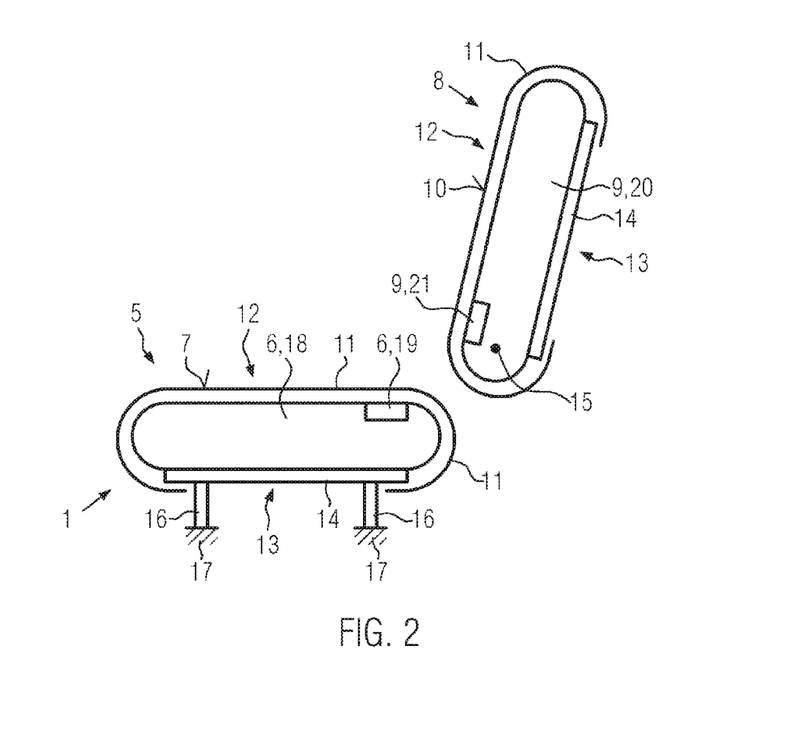
FIG. 2 shows a longitudinal section through the vehicle seat.

The vehicle seat 1, for example the front seat 1, includes a seat part 5 and a backrest part 8. The seat part 5 includes a seat padding 6 of an elastic material, namely foam material, and the seat padding 6 is fastened on an essentially plate-shaped shell structure 14. The shell structure 14 is fixed on the vehicle body 17 by means of a seat mounting 16. A seat cover 11 of fabric or leather is arranged on an upper side 12 of the seat padding 6. The side of the seat part 5 that lies opposite of the upper side 12 is the underside 13. A seat surface 7 on the seat cover 11 serves for directly contacting a person seated in the vehicle seat 1. The backrest part 8 analogously includes a backrest padding 9 of an elastic foam material, as well as the seat cover 11 that is arranged on an upper side 12 of the backrest padding 9 and respectively forms or defines a backrest surface 10. The upper side 12 is the side of the backrest part 8 that faces the person and the side that lies opposite of the upper side 12 is the underside 13 of the backrest part 8. The backrest padding 9 is also fastened on a shell structure 14. The shell structure 14 of the seat part 5 is connected to the shell structure 14 of the backrest part 8 by means of a not-shown connecting device and the backrest part 8 can furthermore be pivoted about a pivoting axis 15.

The seat padding 6 is composed of two parts, namely of a primary seat padding part 18 and a secondary seat padding part 19. In this case, the secondary seat padding part 19 is softer than the primary seat padding part 18. The backrest padding 9 is analogously composed of a primary backrest padding part 20 and a secondary backrest padding part 21 and the secondary backrest padding part 21 is softer than the primary backrest padding part 20.

Figure 12:
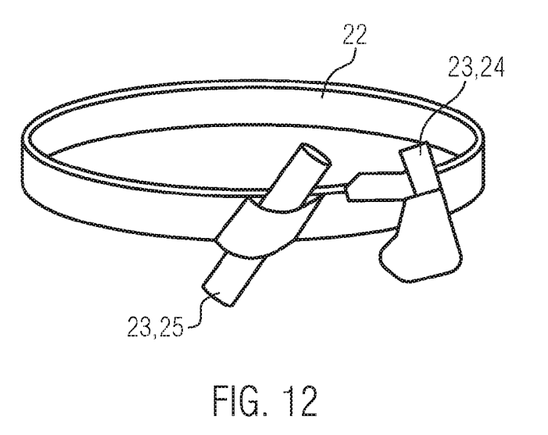
FIG. 12 shows a perspective view of a belt with objects such as, e.g., a gun.

When a person such as, for example, a policeman, who carries objects 23 such as, for example, a gun 24, a baton 25 or hand cuffs on a belt 22, is seated in the vehicle seat 1, compressive forces occur between the person and the vehicle seat 1. The objects 23 on the belt 22 form local bulges referred to the geometry of the body of the person such that higher compressive forces would therefore occur between the person and the vehicle seat on the objects 23. The secondary seat padding part 19 and the secondary backrest padding part 21 are in this case positioned on the vehicle seat 1 in such a way that the objects 23 lie indirectly on the secondary seat padding part 19 and the secondary backrest padding part 21 via the seat covers 11. Due to the softer properties of the secondary seat padding part 19 and the secondary backrest padding part 21, essentially identical compressive forces therefore occur between the body of the person and the vehicle seat in the region of the objects 23, as well as in the regions outside the objects 23. For example, a policeman with a motor vehicle 2 in the form of an emergency vehicle therefore can be comfortably and conveniently seated in the vehicle seat 1 for prolonged periods of time because essentially the same compressive forces as in regions outside the objects 23 also act between the person and the vehicle seat 1 in the region of the objects 23.

Figure 3:
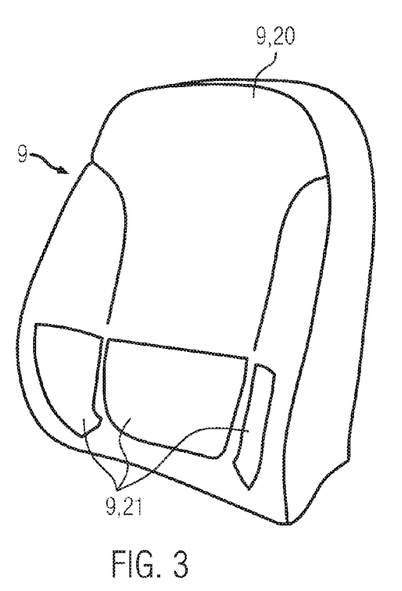
FIG. 3 shows a perspective view of a backrest padding according to a first exemplary embodiment.
Figure 4:
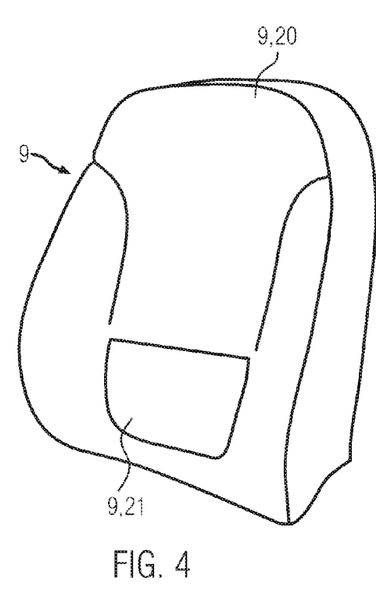
FIG. 4 shows a perspective view of the backrest padding according to a second exemplary embodiment.
Figure 5:
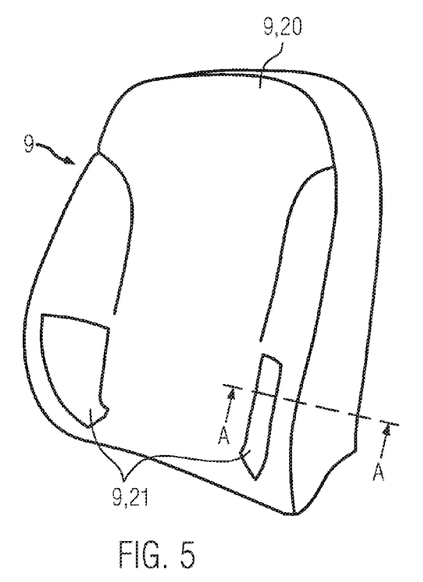
FIG. 5 shows a perspective view of the backrest padding according to a third exemplary embodiment.
Figure 6:
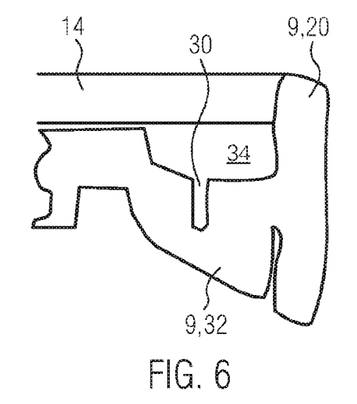
FIG. 6 shows a partial cross section A-A through the backrest padding according to FIG. 5 before the removal of a backrest padding section.
Figure 7:
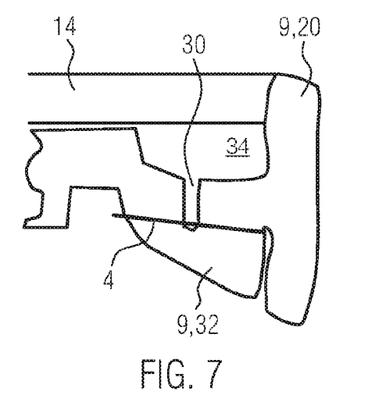
FIG. 7 shows the partial cross section according to FIG. 6 with a cutting line.

FIGS. 3, 4 and 5 show different exemplary embodiments of the arrangement of secondary backrest padding parts 21 on an upper side 12 of the backrest padding 9. This also applies analogously to the seat padding 6. The secondary backrest padding parts 21 are in this case arranged within a recess 33 of the primary backrest padding part 20 such that the upper sides 12 of the secondary backrest padding part 21 and of the primary backrest padding part 20 respectively end flush.

Figure 8:
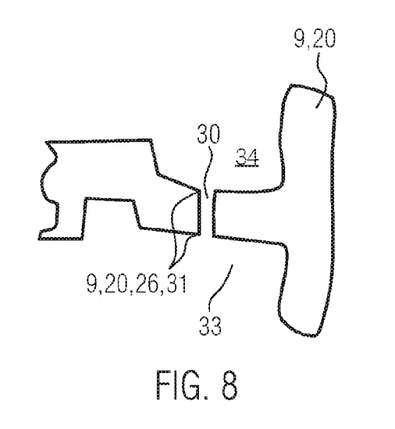
FIG. 8 shows the partial cross section according to FIG. 6 after the removal of the backrest padding section.
Figure 9:
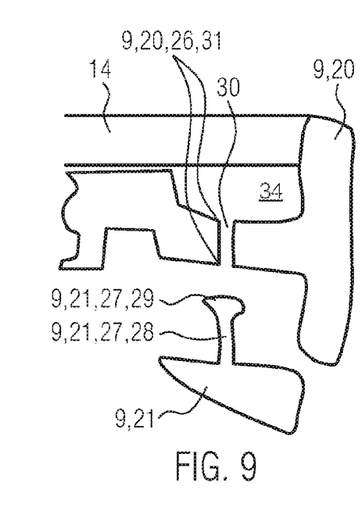
FIG. 9 shows the partial cross section according to FIG. 8 with a secondary backrest padding part.
Figure 10:
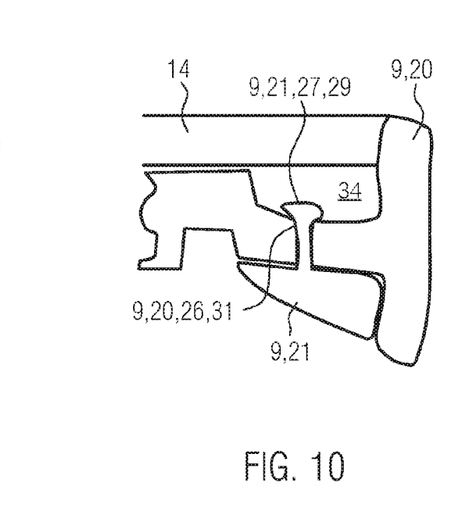
FIG. 10 shows the partial cross section according to FIG. 8 with the secondary backrest padding part that is fastened on a secondary backrest padding part.

FIGS. 6 to 10 show the steps for manufacturing a vehicle seat 1 with the backrest padding 9 illustrated in FIG. 5. In this case, FIGS. 6 to 10 respectively show a partial horizontal cross section A-A according to FIG. 5 through the backrest padding 9 in the region of the secondary backrest padding part 21. The backrest padding 9 is produced in one piece of a foam material part and can be used for normal motor vehicles 2. However, if it is used in a motor vehicle 2 in the form of an emergency vehicle, a section 32 of the seat padding 6 is removed along a cutting line 4 (FIG. 7) such that a recess 33 remains after the removal of the section 32 (FIG. 8). The remainder of the originally produced seat padding 6 of foam material therefore forms the primary backrest padding part 20. This primary backrest padding part is already provided with a bore 30 in the form of a blind bore 30 extending from a void 34 during its production such that the bore 30 starts at the void 34 and ends at the recess 33 in the form of a through-bore 30 after the removal of the section 32 along the cutting line 4 (FIG. 8).

The secondary backrest padding part 21 (FIGS. 9 and 10) is substantially softer than the primary backrest padding part 20 and features a complementary fastening element 27 in the form of a neck 28, wherein a thickening 29 or a head 29 is respectively formed on the end of the neck 28. The head 29, the neck 28 and the remaining secondary backrest padding part 21 are made of the same material as the primary backrest padding part 20, namely foam material, but with a different material quality, namely with substantially softer properties. The bore 30 is defined by a boundary 31 and this boundary 31 is formed by the primary backrest padding part 20. In this case, the boundary 31 forms a fastening element 26. In order to fasten the secondary backrest padding part 21 on the primary backrest padding part 20, the neck 28 with the thickening 29 is initially inserted into the bore 30 such that an elastic deformation of the thickening 29 and also the boundary 31 occurs. After the neck 28 has been completely inserted, the thickening 29 is arranged outside the bore 30 once its shape has been elastically restored (FIG. 10) and lies on the boundary 31 such that a positive connection between the head 29 and the boundary 31 is thereby produced. Subsequently, the seat cover 11 is placed and fixed on the primary backrest padding part 20 and the secondary backrest padding part 21 (not illustrated in FIG. 10).

The above-described manufacturing method for the backrest padding 9 also can be analogously utilized for the seat padding 6.

Figure 11:
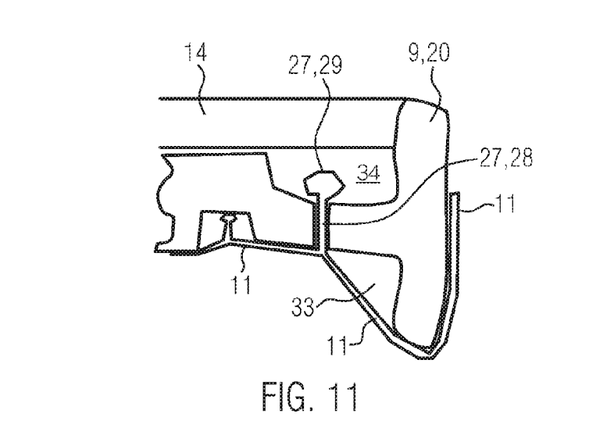
FIG. 11 shows the partial cross section according to FIG. 8 with a seat cover that is fastened on the primary backrest padding part.

In another manufacturing method for the vehicle seat 1, the seat cover 11 with the neck 28 and the thickening 29 is fastened on the primary backrest padding part rather than the secondary backrest padding part 21 of soft foam material after the above-described step in FIG. 8 such that a recess 33 for accommodating the objects 23 is thereby provided on the backrest padding 9 above the seat cover 1 after the manufacture of the vehicle seat 1.

All in all, the vehicle seat 1 as disclosed herein provides significant advantages. The backrest padding 9 can in this case be used for the manufacture of normal vehicle seats 1, as well as for the manufacture of vehicle seats 1 for emergency vehicles. Due to the already existing bore 30, it is merely required to remove the section 32 such that either the secondary backrest padding part 21 of elastic foam material or directly the seat cover 11 can be fastened on the recess 33 in order to provide a recess 33 on the backrest padding 9. When the vehicle seat 1 is used in motor vehicles 2 in the form of emergency vehicles 2, the resulting compressive forces between objects 23 on the person and the vehicle seat 1 are essentially identical to the compressive forces occurring between the person and the vehicle seat 1 in regions outside the objects 23. In this way, for example, a policeman seated in the vehicle seat 1 can conveniently and comfortably perform the assigned duties in the vehicle seat 1 for prolonged periods of time. When the motor vehicle 2 in the form of an emergency vehicle 2 is subsequently sold, it can be easily restored by simply removing the secondary backrest padding part 21 and replacing the secondary backrest padding part 21 of soft foam material with a backrest padding part that respectively has the same hardness or softness as the primary backrest padding part 20 and is subsequently inserted into or fastened on the recess 33.

While at least one exemplary embodiment has been presented in the foregoing detailed description, it should be appreciated that a vast number of variations exist. It should also be appreciated that the exemplary embodiment is only an example, and are not intended to limit the scope, applicability, or configuration of the present disclosure in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the present disclosure as set forth in the appended claims and their legal equivalents.

The invention claimed is:

1. A vehicle seat for a motor vehicle having a seat part with an elastic seat padding, a backrest part with an elastic backrest padding, a seat cover for the seat part and a seat cover for the backrest part, wherein the vehicle seat comprises:
    at least one primary padding part and at least one secondary padding part secured to the primary padding part, wherein the at least one secondary padding part is softer than the primary padding part;
    at least one fastener securing the secondary padding part on a first side of the primary padding part, the at least one fastener including:
    a first fastening element having a void formed in a second side of the primary padding part and a bore defined by a boundary, the bore extending through the primary padding part from the first side and to the void; and
    a second fastening element located on the at least one secondary padding part, the second fastening element including a neck extending from the secondary padding part and configured to be inserted into the bore and a thickening on a distal end of the neck positioned in the void;
    wherein a diameter of the thickening is greater than a diameter of the bore such that the second fastening element is fastened on the boundary of the bore with the thickening; and
    a recess formed in at least one of the primary padding part and the at least one secondary padding part configured to accommodate an object on an occupant seated in the vehicle seat.

2. The vehicle seat according to claim 1, wherein the at least one secondary padding part is realized on the first side of the primary padding part such that the seat cover for the seat part lies on the at least one secondary padding part.

3. The vehicle seat according to claim 1, wherein at least a portion of the elastic seat padding comprises a foam material.

4. The vehicle seat according to claim 1, wherein at least one of the seat part and the backrest part comprises a shell structure and the elastic padding thereof is fastened on the shell structure.

5. The vehicle seat according to claim 1, wherein the at least one primary padding part includes a primary backrest padding part and the at least one secondary padding part includes at least one secondary backrest padding part.

6. The vehicle seat according to claim 1, wherein the second fastening element on the at least one secondary padding part is realized integrally with and made of the same matetial as the at least one secondary padding part.

7. The vehicle seat according to claim 6, wherein the first fastening element on the at least one primary padding part is realized integrally with and made of the same material as the at least one primary padding part.

8. The vehicle seat according to claim 1, wherein the at least one primary padding part includes a primary seat padding part and the at least one secondary padding part includes at least one secondary seat padding part.

9. The vehicle seat according to claim 8, wherein the at least one primary padding part includes a primary backrest padding part and the at least one secondary padding part includes at least one secondary backrest padding part.

10. A motor vehicle with at least one said vehicle seat according to claim 1.

\* \* \* \* \*